United States Patent [19]
Pawlak et al.

[11] Patent Number: 5,491,632
[45] Date of Patent: Feb. 13, 1996

[54] ROTARY ENCODER WITH NEUTRAL POSITION

[75] Inventors: Andrzej M. Pawlak; William C. Lin, both of Troy; David W. Graber, Millington; Dennis C. Eckhardt, Saginaw; Scott E. Weiss, Bay City; Maged Radamis, Mt. Morris; Thomas A. Perry, Washington; John R. Bradley, Clarkston, all of Mich.

[73] Assignees: General Motors Corporation, Detroit, Mich.; Delco Electronics Corporation, Kokomo, Ind.

[21] Appl. No.: 249,409

[22] Filed: May 26, 1994

[51] Int. Cl.[6] .................................................. B62D 5/00
[52] U.S. Cl. ................................ 364/424.05; 364/559
[58] Field of Search ........................ 364/424.05, 559; 180/79.1, 140, 141, 142, 143; 148/103; 324/207.11, 207.21, 207.22, 207.25

[56] References Cited

U.S. PATENT DOCUMENTS

| | | | |
|---|---|---|---|
| 4,803,629 | 2/1989 | Noto et al. | 364/424.05 |
| 4,856,607 | 8/1989 | Sueshige et al. | 180/142 |
| 4,939,654 | 7/1990 | Kouda et al. | 180/141 |
| 4,999,776 | 3/1991 | Soltis et al. | 364/424.05 |
| 5,065,323 | 11/1991 | Shiraishi et al. | 364/424.05 |
| 5,065,324 | 11/1991 | Oshita et al. | 180/79.1 |
| 5,089,060 | 2/1992 | Bradley et al. | 148/103 |
| 5,091,021 | 2/1992 | Perry et al. | 148/103 |
| 5,121,322 | 6/1992 | Shiraishi et al. | 364/424.05 |
| 5,122,955 | 6/1992 | Ishikawa et al. | 364/424.05 |
| 5,203,420 | 4/1993 | Shiraishi | 180/79.1 |
| 5,283,740 | 2/1994 | Sato et al. | 364/424.05 |
| 5,434,784 | 7/1995 | Bradley et al. | 364/424.05 |

OTHER PUBLICATIONS

*Research Disclosure*, p. 468, Jun. 1992, #33855, "Sensing Steering Position and Rate with Magnetic Speed Variable Assist System" (Disclosed Anonymously).

*Primary Examiner*—Gary Chin
*Attorney, Agent, or Firm*—Timothy G. Gorbatoff

[57] ABSTRACT

A rotary encoder capable of detecting angular rotation of a rotating shaft, and identifying its neutral position without the need for multiple encoder wheels. A magnetoresistive sensor is positioned adjacent the periphery of a single multipole magnet ring attached to a steering wheel shaft. The magnet ring comprises alternating N-pole and S-pole magnetic regions along its periphery, the surface of one of the regions containing a demagnetized portion. The sensor produces a sinusoidal signal as the shaft is rotated, responsive to the passage of the magnetic regions, with a period equal to the passage of two successive magnetic regions adjacent the sensor. The angular position of the shaft which aligns the demagnetized portion adjacent the sensor corresponds to the shaft's neutral position. Aligning of the demagnetized portion adjacent the sensor causes a voltage irregularity within the sensor's otherwise sinusoidal output signal, which is detected by a signal processing circuit.

3 Claims, 3 Drawing Sheets

ROTARY ENCODER WITH NEUTRAL POSITION

The present invention relates to an encoder for detecting angular rotation of a rotary object such as a vehicle steering wheel, and more particularly, to a rotary encoder capable of detecting a neutral position of the rotary object corresponding to a predetermined angular position.

BACKGROUND OF THE INVENTION

Rotary encoders have many applications, including detection of vehicle steering wheel angular rotation. Typical prior art rotary encoders include a first encoder wheel attached to a rotating shaft. The periphery of the first encoder wheel comprises alternating equally-spaced N-pole and S-pole magnetic regions. A first magnetic detection sensor, such as a magnetoresistor or Hall sensor, is positioned adjacent the periphery of the first encoder wheel and produces a signal responsive to the passage of magnetic regions adjacent the sensor as the shaft is rotated. Each sensed magnetic region corresponds to rotation of the shaft by an incremental number of degrees equal to 360° divided by the total number of magnetic regions.

Although this information enables detection of angular rotation of the shaft, it does not enable detection of a neutral position corresponding to a predetermined angular position. Therefore, a second encoder wheel is required. It is attached to a shaft and comprises a single magnetic region located within a defined portion along the encoder wheel periphery.

The angular position of the shaft which aligns the single magnetic region of the second encoder wheel adjacent a second magnetic detection sensor is referred to as the neutral position of the shaft and corresponds to a predetermined angular position. The neutral position of a steering wheel corresponds to the angular position of the steering wheel resulting in a straight direction of vehicle travel. Once the neutral position is identified, absolute angular positions of the steering wheel can be continuously identified in accordance with the direction of shaft rotation and the number of magnetic regions detected by the first sensor.

SUMMARY OF THE INVENTION

The present invention is directed to a rotary encoder capable of detecting angular rotation of a rotating shaft, and identifying its neutral position, without the need for multiple encoder wheels. According to the present invention, a magnetoresistive sensor is positioned adjacent the periphery of a single multipole magnet ring attached to a steering wheel shaft. The magnet ring comprises individual permanent magnets having one of two magnetic orientations, joined to provide for a periphery of alternating N-pole and S-pole magnetic regions.

The surface of one of the magnetic regions comprises a demagnetized portion, produced by exposing the surface of the magnetic region within a localized portion to a laser beam which heats the surface of the localized portion to a temperature sufficient to cause thermal demagnetization. For a more detailed explanation of this process, please refer to U.S. Pat. No. 5,089,060 issued Feb. 18, 1992, to Bradley et al. entitled "Thermomagnetically Patterned Magnets and Method of Making Same" and U.S. Pat. No. 5,091,021 issued Feb. 25, 1992, to Perry et al. entitled "Magnetically Coded Device and Method of Manufacture", both assigned to the assignee of the present invention.

The magnetoresistive sensor produces a sinusoidal signal as the shaft is rotated, responsive to the passage of the magnetic regions of alternating polarity, with a period equal to the passage of two successive magnetic regions adjacent the sensor. Aligning of the laser notch with the sensor causes a voltage irregularity within the sensor's otherwise sinusoidal output signal, which is detected by a signal processing circuit. The angular position of the shaft which aligns the demagnetized portion, or laser notch, adjacent the sensor corresponds to the shaft's neutral position.

DETAILED DESCRIPTION OF THE PREFERRED EMBODIMENT

Figure 1:
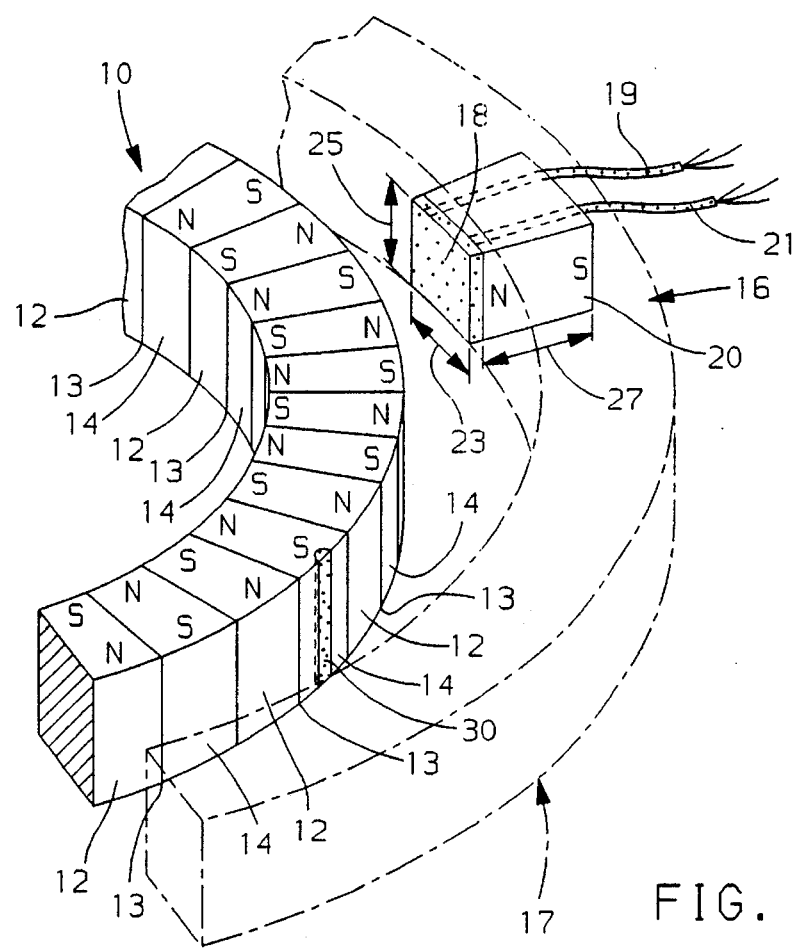
FIG. 1 illustrates a rotary encoder comprising a multipole magnet ring and magnetoresistive sensor.

FIG. 1 illustrates a rotary encoder in accordance with the present invention. The encoder wheel of the preferred embodiment is a multipole magnet ring 10 comprising individual permanent magnets 12 and 14 magnetized in one of two orientations, joined together forming joints 13. The individual permanent magnets 12 and 14 are arranged such that adjacent permanent magnets 12 and 14 have opposing magnetic orientations whereby the periphery of the multipole magnet ring 10 comprises equally-sized alternating N-pole 12 and S-pole 14 magnetic regions. The multipole magnet ring 10 is attached to a rotatable object such as a shaft (not shown) which is attached to and rotated by a vehicle steering wheel.

A magnetoresistive sensor 16 comprises a magnetoresistive element 18 mounted on a small biasing magnet 20, packaged in a housing 17 and located adjacent the periphery of the multipole magnet ring 10. The biasing magnet 20 is magnetized perpendicular to the sensor plane with an N-pole adjacent the magnet ring 10.

The resistance of the magnetoresistive element 18 varies in response to the strength of the magnetic field to which it is subjected. A magnetic field in proximity to the element 18 is established by the biasing magnet 20 and multipole ring magnet 10. The magnetic field is weakest when the sensor 16 is centered on a magnetic region 12 with a repelling adjacent N-polarity, and strongest when the sensor 16 is centered on a magnetic region 14 with a supportive adjacent S-polarity.

The resistance of the magnetoresistive element 18 will be at a minimum with an N-pole magnetic region 12 adjacent the sensor 16. Conversely, the resistance of the magnetoresistive element 18 will be at a maximum with an S-pole magnetic region 14 adjacent the sensor 16. By applying a constant current source (not shown) to the magnetoresistive element 18, a voltage signal corresponding to the resistance of the magnetoresistive element 18 can be obtained via signal lines 19 and 21.

Signal strength is enhanced when the width 25 and length 23 of the magnetoresistive element 18 and biasing magnet 20 are equal. The depth 27 of the biasing magnet 20 is chosen to develop a sufficient magnetic field between the biasing magnet 20 and the multipole magnet ring 10 for satisfactory signal voltage levels. Sensor manufacturing and reliability can be enhanced when the housing 17 in which it is packaged is composed of plastic. Modern processes can injection mold the housing 17 around the magnetoresistive sensor 16, encapsulating the signal leads 19 and 21.

During manufacturing of the steering wheel shaft/magnet ring assembly, a localized portion 30 along the periphery of the multipole magnet ring 10 and centered within one of the magnetic regions 12 and 14 is exposed to a laser beam (not shown) which heats the surface of the localized portion 30 to a temperature sufficient to cause thermal demagnetization within the localized portion 30. The position of the demagnetized portion 30 is strategically selected such that the angular position of the multipole magnet ring 10 which aligns the locally demagnetized portion 30, or laser notch, adjacent the magnetoresistive sensor 16 corresponds to the shaft's neutral position. The neutral position of the steering wheel shaft corresponds to the angular position of the steering wheel resulting in a straight direction of vehicle travel.

Figure 2:
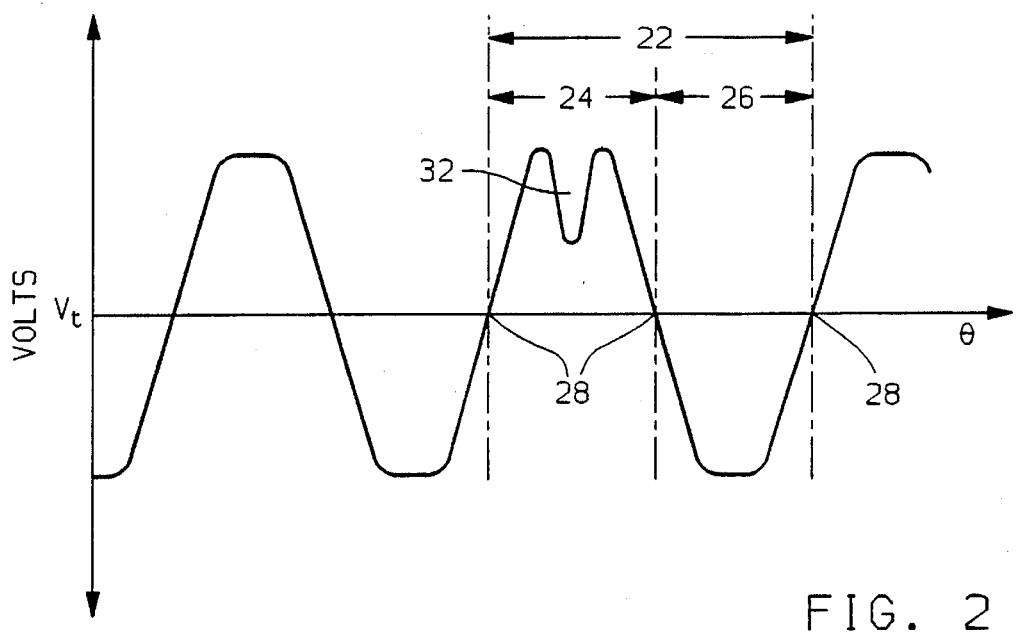
FIG. 2 illustrates an output signal generated by the magnetoresistive sensor in response to rotation of the multipole magnet ring.

As illustrated in FIG. 2, rotation of the multipole magnet ring 10 results in a sinusoidally varying voltage across the magnetoresistive element 18 in accordance with its sinusoidally varying resistance resulting from the varying magnetic field in proximity to the sensor 16. Each period 22 corresponds to passage of two successive magnetic regions adjacent the magnetoresistive sensor 16. One-half of each period 24 represents passage of a magnetic region of one polarity, while the remaining half of each period 26 represents passage of a magnetic region of an opposing polarity. Crossings 28 relative to a threshold voltage level $V_t$ represent passage of a joint 13 adjacent the sensor 16.

Each half-period 24 and 26, reflects rotation of the steering wheel shaft by an incremental number of degrees, equal to 360° divided by the total number of magnetic regions, 12 and 14. Resolution of the encoder can, therefore, be improved by increasing the number of magnetic regions. Magnetic regions must be added in pairs to maintain alternating magnetic regions of opposing polarity along the multipole magnet ring periphery.

Resolution can also be improved by increasing the number of magnetoresistive sensors 16, equally spacing them within a one-half signal period. For example, if a half-period corresponds to 12° of shaft rotation (i.e., 30 magnetic regions), a three-sensor encoder would provide adjacent sensors spaced 4° apart. The output signal from each sensor would be identical to one another, but phase shifted by 4° or one-sixth of a period. Multiple sensors also permit detection of rotational direction.

Figure 3:
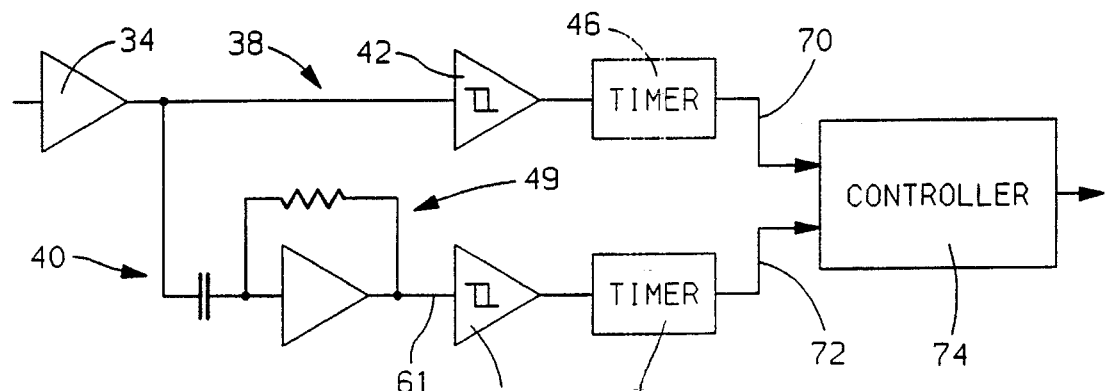
FIG. 3 illustrates a circuit which processes the sensor output signal of FIG. 2 to detect the voltage irregularity associated with the laser notch.

Passage of the laser notch 30 adjacent the magnetoresistive sensor 16 results in a voltage notch 32, or irregularity, in the sensor's otherwise sinusoidal output signal at the signal's maximum peak voltage. Location of the laser notch 30 within an N-pole magnetic region 12 of FIG. 1 would result in the voltage notch 32 occurring at the signal's minimum peak voltage. The voltage notch 32 can be detected via the signal processing circuit illustrated in FIG. 3, resulting in the waveforms illustrated in FIGS. 4A–D.

Figure 4A:
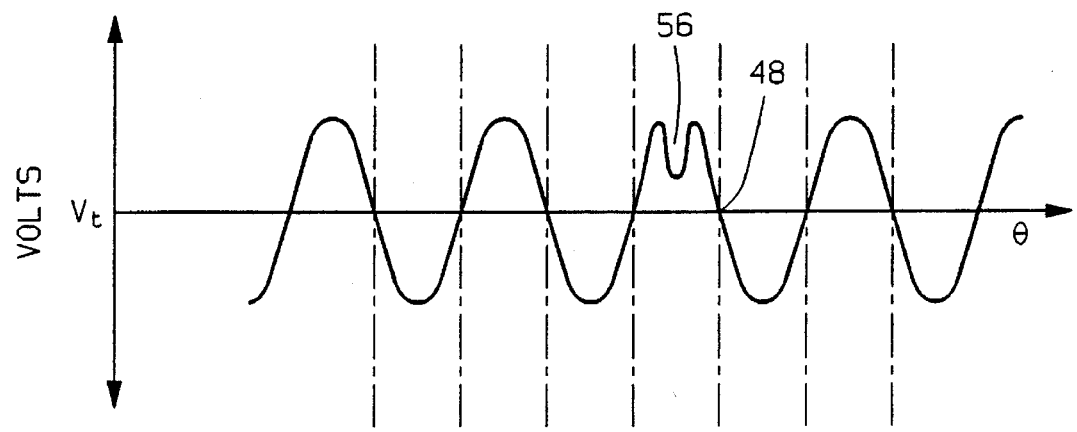
FIG. 4A–4D illustrates waveforms occurring within the signal processing circuit of FIG. 3.

Referring to FIG. 3 and FIGS. 4A–D, the original sensor output signal of FIG. 2 is filtered by filter 34 to eliminate unwanted noise, thereby smoothing, or averaging, the original signal. The filtered signal, shown in FIG. 4A, is then branched off into two signal paths 38 and 40. The first signal path 38 converts the filtered signal into a binary signal, shown in FIG. 4B, by means of a Schmitt trigger 42. Voltages greater than a predetermined threshold voltage $V_t$ result in a voltage pulse having a first binary voltage 45 (e.g., 5 V). Voltages less than the predetermined threshold voltage $V_t$ result in a low voltage base level signal with a second binary voltage 47 (e.g., 0 V).

Figure 4B:
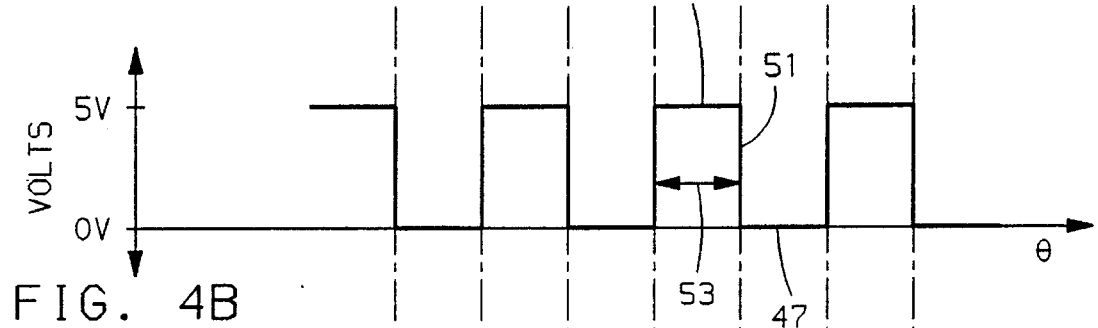

The filtered voltage notch 56 of FIG. 4A does not appear in the binary signal of FIG. 4B because it remains above the threshold voltage $V_t$ at all times. Crossings 48 of the filtered signal of FIG. 4A correspond in FIG. 4B to signal transitions 51 between the first and second binary voltages, 45 and 47, respectively. Each crossing 48 also corresponds to angular rotation of the multipole magnet ring 10 by an incremental number of degrees. The binary signal of FIG. 4B is then fed into a timer 46 which outputs a signal corresponding to the duration (width) 53 of each voltage pulse, referred to as TIME1.

Figure 4C:
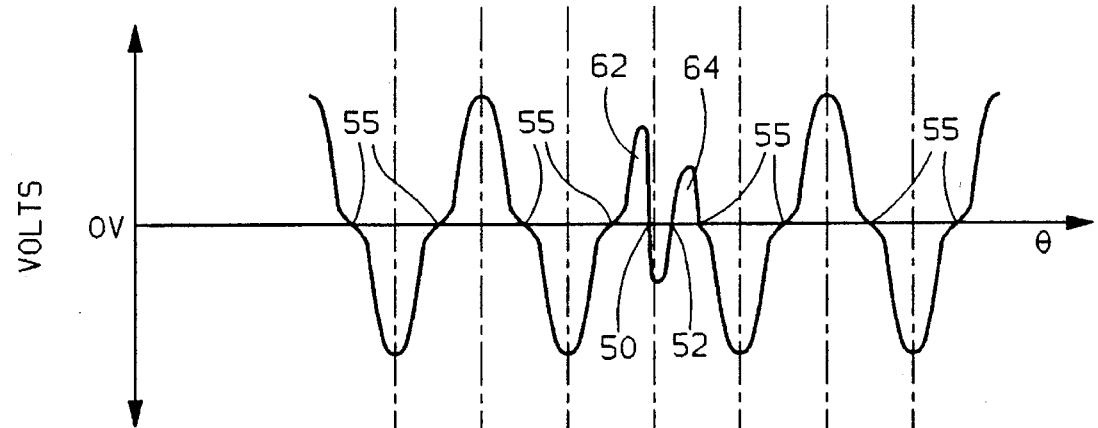

A differentiator, referred to generally by reference numeral 49, in the second signal path 40 differentiates the filtered signal of FIG. 4A to produce a signal at point 61 as shown in FIG. 4C. Differentiating the signal of FIG. 4A produces a signal representing the rate of change of signal voltage of FIG. 4A. Negative signal values in FIG. 4C represent negative signal slopes in FIG. 4A, while positive signal values in FIG. 4C represent positive signal slopes in FIG. 4A. Therefore, zero voltage crossings 55 in FIG. 4C occur when the signal slope of FIG. 4A changes direction (i.e., zero slope).

Figure 4D:
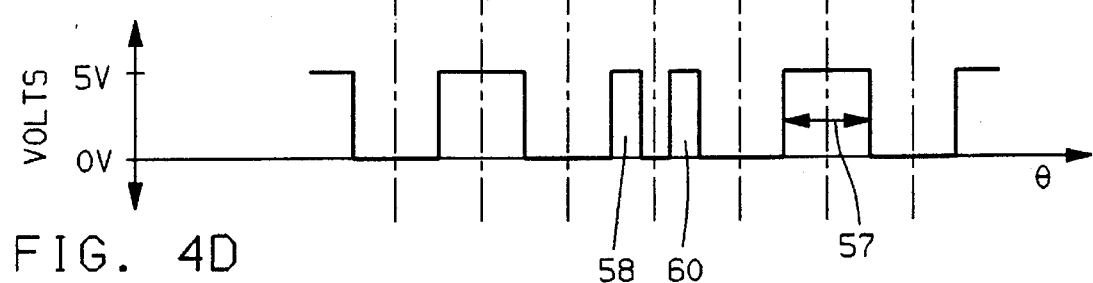

The differentiated signal of FIG. 4C is then converted into a binary signal, shown in FIG. 4D, by means of a Schmitt trigger 55 in a like fashion as described above. The voltage notch 56 of FIG. 4A produces two additional zero crossings 50 and 52 in FIG. 4C resulting in two narrower voltage pulses 58 and 60 of FIG. 4D, where there otherwise would have been one voltage pulse with a duration 57 beginning with the first voltage pulse 58 and ending with the second voltage pulse 60.

The binary signal of FIG. 4D is then fed into a timer 68 which outputs a signal corresponding to the duration 57 of each voltage pulse, referred to as TIME2. The binary signals of FIGS. 4B and 4D are substantially similar, except for one portion of the binary signal of FIG. 4D which contains two narrower voltage pulses, 58 and 60. These narrower pulses correspond to the portions 62 and 64 of the differentiated signal of FIG. 4C greater than zero volts. The timer values, TIME1 and TIME2, are fed into a controller 74 via signal lines 70 and 72, respectively, which executes the algorithm illustrated in FIG. 5.

As illustrated in FIGS. 4A and 4D, the half-period containing a voltage notch 56 will result in two narrower pulses, 58 and 60, rather than one which spans across the two narrower ones. The notch recognition algorithm operates to detect these much narrower pulses as an indication of the presence of a voltage notch 56, and thereby the laser notch 30.

Figure 5:
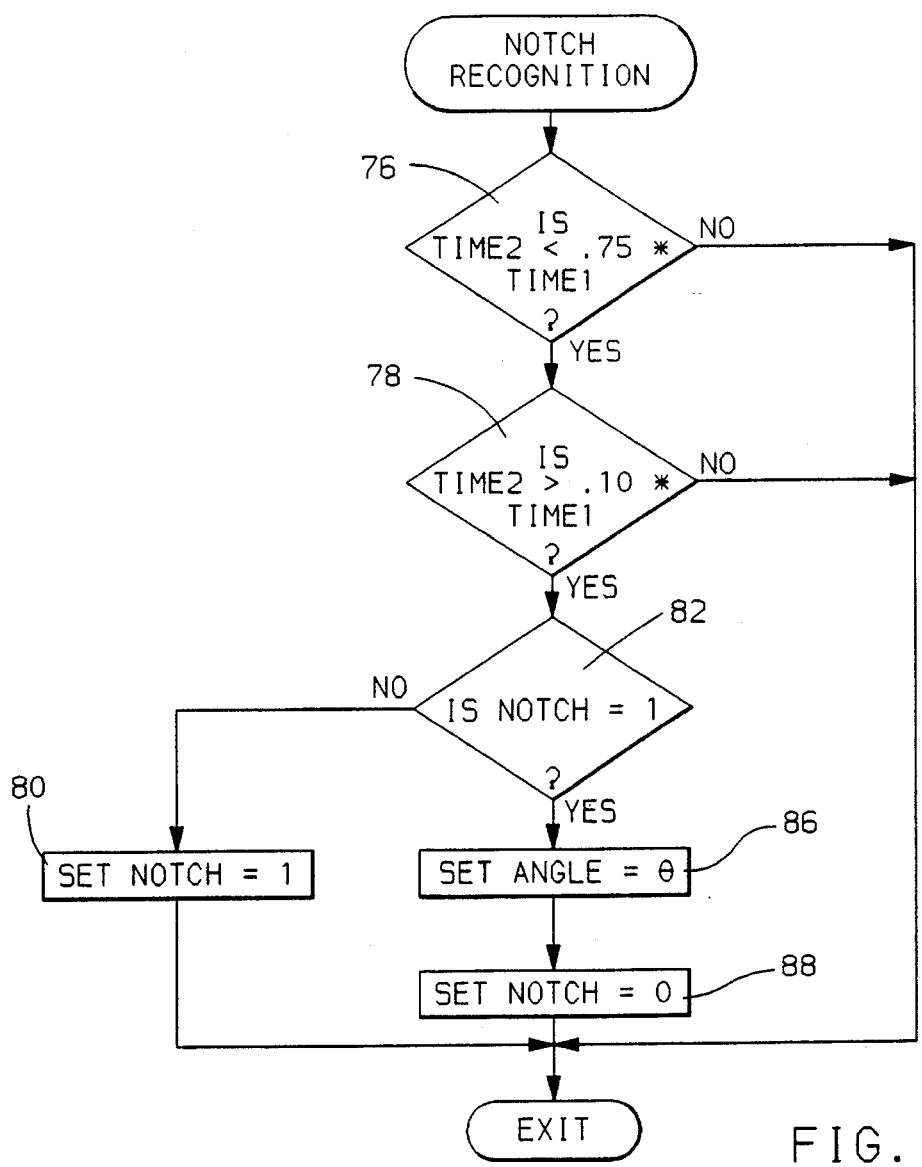
FIG. 5 illustrates a laser notch detection algorithm executed by a controller for detecting a laser notch from the output of the signal processing circuit of FIG. 3.

Referring to FIG. 5, the notch recognition algorithm begins at step 76 by determining whether the measured pulse duration 57 of FIG. 4D (TIME2) is less than a first predetermined percentage (e.g., 75 %) of the pulse duration 53 of FIG. 4B (TIME1). The pulse duration 53 of FIG. 4B is used as a standard for comparison. Factors such as rotational speed of the shaft will affect the pulse durations 57 of the binary signal of FIG. 4D. Since the binary signal of FIG. 4B is also affected by the external factors affecting the binary signal of FIG. 4D, using the binary signal of FIG. 4B as a varying standard for comparison will compensate for such factors and ensure accurate notch detection.

If the pulse duration 57 of FIG. 4D (TIME2) is found to be less than the first predetermined percentage of the pulse duration 53 of FIG. 4B (TIME1), a signal irregularity has been detected. However, unwanted noise may influence pulse duration, and filtering of the original signal of FIG. 2 may not be sufficient to eliminate all such noise. Noise often manifests itself in a signal as a spike with a very narrow pulse duration. Therefore, in order to avoid mistakenly detecting a noise spike as a voltage notch, step 78 requires that the pulse duration 57 of FIG. 4D (TIME2) be greater than a second predetermined percentage (e.g., 10%) of the pulse duration 53 of FIG. 4B (TIME1).

If both conditions 76 and 78 are satisfied, one of the two narrow pulses 58 and 60 has been detected. If either of the two conditions 76 and 78 are not satisfied, evidence of a voltage notch has not been detected and the algorithm exits.

As a further verification of voltage notch identification, the algorithm requires detection of the second of the two narrower pulses 58 and 60. It achieves this by setting a flag called NOTCH at step 80. The next operation of the algorithm repeats steps 76 and 78, comparing the next measured pulse durations 53 and 57, TIME1 and TIME2, respectively, of the two binary signals.

If both conditions 76 and 78 are again satisfied, the algorithm checks at step 82 whether a narrow pulse 58 and 60 was detected during the last operation. If so, sufficient assurances exist to conclude that the second of the two narrow pulses 58 and 60 has been detected, evidencing the existence of a voltage notch. In step 86, the program assigns to the present shaft angle, referred to as ANGLE, an absolute, predetermined angular (neutral) position. The notch flag, NOTCH, is cleared in step 88 and the algorithm exits.

Detection of the neutral position of the rotatable shaft can be utilized by appropriate controllers to continually identify the actual absolute angular position of the shaft by tracking the number of binary pulses generated and the direction of steering wheel rotation. Angular velocity can also be determined by appropriate controllers in accordance with the frequency of binary pulses generated.

The embodiments of this invention in which an exclusive property or privilege is claimed are defined as follows:

1. An apparatus for detecting angular rotation and a neutral position of a rotary object, the neutral position corresponding to a predetermined angular position of the rotary object, the apparatus comprising:

an encoder wheel attached to the rotary object, the periphery of the encoder wheel having equally-sized alternating regions of N-pole and S-pole magnetization, one of the magnetized regions having a demagnetized portion;

a sensor located adjacent the periphery of the encoder wheel and generating a sinusoidal output signal responsive to passage of the magnetized regions as the encoder wheel is rotated, a period of the sinusoidal output signal corresponding to passage of two successive magnetic regions, passage of the demagnetized portion resulting in a signal irregularity;

means for detecting values of the sinusoidal output signal equal to a predetermined threshold voltage, each detected value corresponding to an incremental angular rotation of the rotary object; and means for detecting the signal irregularity, the angular position of the rotary object when the signal irregularity is detected being the neutral position of the rotary object.

2. The apparatus according to claim 1, wherein the means for detecting the signal irregularity comprises:

means for filtering the sinusoidal output signal;

means for timing the duration of voltage values of the filtered sinusoidal output signal greater than a predetermined threshold voltage;

means for differentiating the sinusoidal output signal;

means for timing the duration of voltage values of the differentiated sinusoidal output signal greater than zero volt;

means for determining whether the duration of voltage values of the differentiated sinusoidal output signal greater than zero volt is less than a first predetermined percentage of the duration of voltage values of the filtered sinusoidal output signal greater than the predetermined threshold voltage; and means for determining whether the duration of voltage values of the differentiated sinusoidal output signal greater than zero volt is greater than a second predetermined percentage of the duration of voltage values of the filtered sinusoidal output signal greater than the predetermined threshold voltage, the signal irregularity being detected when two consecutive durations of voltage values of the differentiated sinusoidal output signal greater than zero volt are (i) less than the first predetermined percentage of the duration of voltage values of the filtered sinusoidal output signal greater than the predetermined threshold voltage, and (ii) greater than the second predetermined percentage of the duration of voltage values of the filtered sinusoidal output signal greater than the predetermined threshold voltage.

3. The apparatus according to claim 1, wherein the encoder wheel comprises individual permanent magnets having one of two magnetic orientations, joined to form an encoder wheel periphery having equally-sized alternating regions of N-pole and S-pole magnetization, the demagnetized portion being centered within one of the magnetized regions and formed by exposing the portion to a laser beam which heats the surface of the magnetic region within the portion to a temperature sufficient to cause surface thermal demagnetization within the portion.

\* \* \* \* \*